Patented Jan. 4, 1949

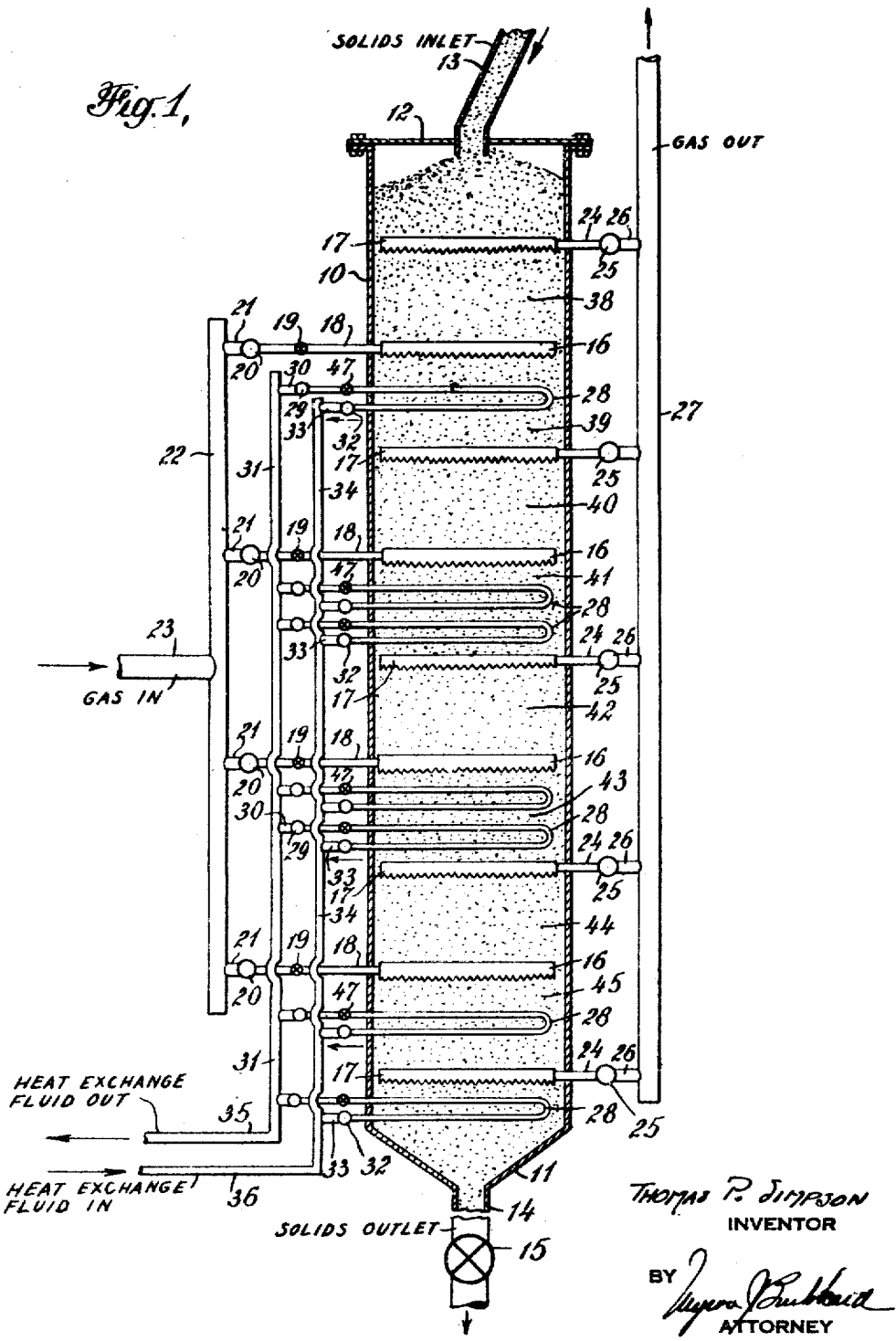

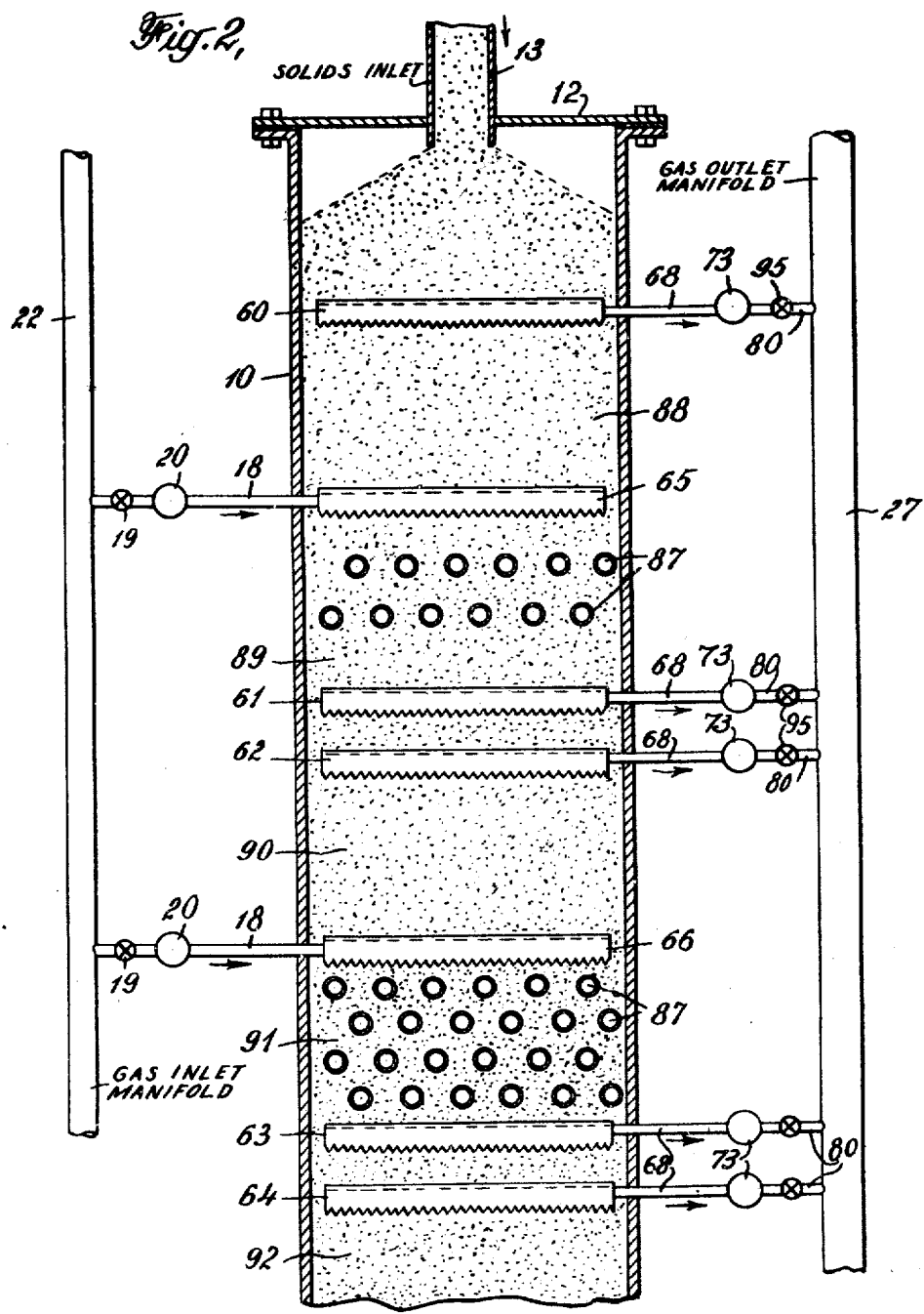

2,458,435

UNITED STATES PATENT OFFICE 2,458,435

METHOD AND APPARATUS FOR REGENERATING A MOVING BED CONTACT MATERIAL

Thomas P. Simpson, Woodbury, N. J., assignor to Socony-Vacuum Oil Company, Incorporated, a corporation of New York Application October 21, 1944, Serial No. 559,734

6 Claims. (Cl. 252—418)

This invention has to do with a method and apparatus for conducting thermochemical gaseous reactions in the presence of a moving particle form solid material which may or may not be catalytic in nature. Such processes are well known to the petroleum industry, examples of which are catalytic hydrogenation, dehydrogenation, desulfurization, alkylation, polymerization, reforming and cracking of petroleum vapors. Typical of such processes is the catalytic cracking of hydrocarbons, it being well known that gas oils boiling between temperatures of the order of 450° F. to 750° F. may be converted to gasoline, gas and other products by passing them at reaction conditions of temperature, such as, for example, temperatures of the order of 875° F. at pressures somewhat above atmospheric in contact with a solid adsorptive catalytic contact mass. Usually such contact masses partake of the nature of natural clays, treated clays or synthetic associations of silica, alumina, or silica and alumina, any of which may or may not have other constituents added, such as certain metallic oxides. In a most recent form, this operation has developed as one in which the particle form solid contact mass material is moved cyclically through two zones, in each of which it flows as a substantially compact column of downwardly moving particle form solid material, in the first of which zones it is subjected to the hydrocarbon reactions and in the second of which it is subjected to the action of a combustion supporting gas acting to burn therefrom a carbonaceous contaminant deposited thereon in the hydrocarbon conversion zone. This contaminant tends to decrease the catalytic effectiveness of the contact mass material for the hydrocarbon conversion reaction and must be removed therefrom in order to regenerate the catalyst to the normal effectiveness. The combustion of said contaminant results in the liberation of large quantities of heat which, if permitted to accumulate in the contact mass material will result in the overheating of said material to temperatures which will cause permanent deterioration of its catalytic effectiveness. In order to properly control the temperature of the solid material during its cyclic travel it has been common practice to provide heat transfer equipment for the removal of heat from said solid material in the regeneration zone, and frequently to provide heat transfer equipment in the reaction zone to supply the endothermic heat required for hydrocarbon conversion. Since the construction of the apparatus and the method of operation is in most respects similar in the case of either the reaction or regeneration zones, the discussion herein and the description of this invention will be mainly limited to the regeneration zone without any intent, however, to limit this invention thereto.

Regenerators in processes of the types above described have in the past been constructed essentially as long vertical vessels through which the gas and solid material flow lengthwise either concurrently or countercurrently. Heat transfer tubes are properly distributed through the regeneration zone and a heat exchange medium maintained at a temperature somewhat below the solid material temperature is passed continuously through said tubes. Generally, in such regenerators, the use of a large amount of heat transfer surface is required on the one hand to limit the distance of any solid particle from a heat transfer surface and thereby prevent the overheating of said solid material and the use of relatively small temperature differentials between the solid material and the heat exchange fluid is required on the other hand to prevent overcooling of the solid material nearest the heat transfer surface. It has been found that more rapid and thorough removal of the carbonaceous contaminant deposit may be obtained by permitting the solid material to rise to temperatures of the order of 1000° F. to 1200° F. in the later stages of the regeneration. This generally may not be done in regeneration of the type above described principally because of the lack of a suitable heat exchange fluid which would be stable at temperatures of the order of 1000° F. to 1100° F. As a result, recent regenerators have been developed which comprise a vertical series of alternate burning and cooling stages, the regeneration gas being charged independently and in parallel to the burning stages and the solid material cooling being accomplished in alternate cooling stages substantially in the absence of contaminant combustion. Such regenerators not only avoid the above mentioned disadvantage of the single stage regenerators, but also, by virture of the multi-stage gas flow have much higher total gas throughput capacities. Moreover, such multi-stage regenerators permit the use of extremely high temperature differentials between the heat exchange medium and the solid material, thereby greatly reducing the total required amount of heat transfer surface. The present invention provides an improved multi-stage type of regenerator which in general involves the use of a vertical series of superimposed regeneration zones or stages so arranged that adjacent zones or stages share common gas inlet means adjacent one of their ends and have gas outlet means adjacent their opposite ends, certain of said regeneration zones or stages being provided with heat transfer surfaces and the remaining stages being without such heat transfer surfaces. The operation and the advantages of the method and apparatus of this invention will become apparent from the following description thereof.

A major object of this invention is the provision of an improved method and apparatus for conducting thermochemical gaseous reactions in the presence of a substantially compact moving mass of particle form solid material while controlling the temperature of the solid material between predetermined limits.

Another object of this invention is the provision of a method and apparatus for regeneration of a moving contaminant bearing particle form solid contact mass material having the advantages of the multi-stage, alternate burning zone and cooling zone type of operation, without the requirement of separate cooling zones between successive burning zones.

Another object of this invention is the provision of an apparatus for regeneration of particle form solid contact mass materials containing carbonaceous contaminant deposits which apparatus offers high regeneration capacity per unit of apparatus volume and economy of construction.

A special object of this invention is the provision in a gas-solid contact operation of the type involving increase in gas volume during contacting, of a method and apparatus adapted to permit disengagement of the gas from the solid material and withdrawal therefrom without substantial solid material entrainment.

These and other objects of this invention will become apparent from the following description of this invention, which will be more readily understood by reference to the attached drawings, Figure 1, which is an elevational view, partially in section, of a desirable form of the apparatus, and Figure 2, which is an elevational view, partially in section of a section of a preferred form of apparatus. Both of these drawings are highly diagrammatic in form.

Turning now to Figure 1, we find the vertical vessel 10 closed on its lower end by a tapered drain section 11 and on its upper end by top 12. A conduit 13 is connected into the top 12 for inlet of solid material and a conduit 14 having a valve 15 thereon is provided on the lower end of the drain section 11. The vessel 10 may be rectangular or round or other cross-sectional shape and it may consist of a single long shell, as shown, or it may be made up of a number of short stage lengths placed one above the other and flanged together. Within the vessel are positioned a plurality of vertically spaced horizontally extending gas inlet distributors 16 and also positioned within said vessel are a plurality of vertically spaced horizontally extending gas outlet collectors 17 arranged at alternate vertical intervals with respect to said distributors. The distributors and collectors may take several forms, a preferred form being that of inverted horizontally extending, open bottomed troughs or channel members arranged in horizontal rows. Thus the distributors and collectors shown at each level in Figure 1 represent one of a number of such members spaced horizontally apart in the direction perpendicular to the plane of the drawing and extending lengthwise horizontally across the vessel as shown. At the level of each row of distributors gas inlet pipes 18 having flow control valves 19 thereon, connect through the vessel shell and into the ends of the distributor members. These pipes connect on their other ends into manifolds 20 which are in turn connected through pipes 21 into riser conduit 22 to which gas may be introduced through the main inlet conduit 23. Similarly pipes 24 connect through the vessel shell into the collector members 17 and connect on their other ends into manifolds 25 which connect through pipes 26 into the gas outlet riser conduit 27. The gas inlet and outlet manifolding, as shown, is intended to be merely exemplary in character and other arrangements may be equally well employed. For example, manifold boxes may be attached to the vessel shell adjacent each row of distributor or collector members, and these boxes may be placed in gaseous communication with the distributor and collector members by means of sheaths extending through the vessel shell. The boxes may also be connected to gas inlet or outlet conduits.

The arrangement shown divides the vessel into a series of superimposed stages or zones, adjacent zones sharing common gas inlet means adjacent one end and common gas outlet means adjacent the opposite end. The arrangement is such that the direction of reactant gas flow through the solid material will be alternately upward and downward in successive zones. Means to control the solid material temperature are positioned within those alternate zones wherein the gas flow is downward; the means shown being horizontal rows of hairpin coils 28 extending at each level uniformly across the vessel and through one wall. These coils connect on one end into manifolds such as 32 which are connected by pipes 33 into the inlet riser manifold 34, and the coils connect on their other ends into manifolds such as 29 which are connected by pipes 30 into the common outlet riser manifold 31. Conduit 36 connects into the inlet riser manifold 34 for passage thereinto of a heat exchange medium from an external circulation and temperature adjusting system (not shown), and conduit 35 connects into the outlet riser 31 for passage of heat exchange medium therefrom back to said external system. It will be noted that the number of rows of hairpin coils provided varies from stage to stage for reasons hereinafter explained. A final row of heat transfer coils is also provided within the vessel below the lowermost reaction stage. The solid material temperature control means, as shown, is highly diagrammatic in character and is not intended to limit this invention. In an actual apparatus the heat transfer tubes or coils are preferably evenly distributed throughout a given reaction stage, although in less preferred modifications they may be concentrated in a portion of the reaction zone. Instead of hairpin coils, tubes may be used similar to those used in thermal cracking furnaces extending entirely across the vessel and through opposite walls. These tubes would be connected on their ends to suitable header boxes which would in turn be connected to the main heat exchange medium inlet and outlet manifolds. Fins may be attached to the heat exchange tubes to increase the heat transfer surface offered thereby.

The application of the apparatus shown, to the continuous process for regenerating particle form solid contact mass materials bearing carbonaceous contaminant deposits may be considered as a typical example of its operation. In such a process, particle form solid material, such as is withdrawn from a hydrocarbon conversion reactor may be passed into the upper end of the vessel 10 through conduit 13. The solid material entering is at a temperature sufficiently high to permit the initiation of the contaminant combustion reaction, for example, 800° F. to 850° F. The solid material then passes downwardly through the uppermost regeneration stage 38 wherein it is contacted with a combustion supporting gas, such as air, passing upwardly therethrough between the uppermost row of distributors 16 and the uppermost row of collectors 17. Since no heat transfer coils are provided within the uppermost stage, the solid material may be heated during its passage therethrough by the heat released by the contaminant combustion. Thus the solid material may enter the second regeneration stage 39 at a temperature of about 1000° F. During its passage through stage 39, it is contacted by downwardly flowing air acting to continue the contaminant combustion, and at the same time the solid material passes in indirect heat transfer relationship with a cooling fluid which is passed through the row of heat transfer coils 28. Not only is the heat liberated by contaminant combustion in stage 39 removed by the heat exchange fluid, but also sufficient heat to cool the solid material to an outlet temperature from stage 39 which is equal to a set predetermined inlet temperature to the next regeneration stage 40, say, for example, 900° F. Since no heat transfer surface is provided in section 40, the predetermined inlet temperature to stage 40 must be sufficiently high to permit the continuance of the combustion reaction at a practically rapid rate and sufficiently low to permit the passage of the solid material through stage 40 without its temperature rising to a level which would cause heat damage to said solid material. For example: assume such maximum temperature is 1200° F. for the particular solid material involved, and to permit a safety factor, a predetermined maximum temperature of 1100° F. is set. Thus the air rate through stage 40, and/or the stage volume and the solid material inlet temperature to stage 40 may be adjusted so that the solid material after passing through stage 40 will leave it and enter stage 41 at about 1100° F. Thus in the example assumed, it would enter stage 40 at 900° F. and leave said stage at 1100° F. Within stage 41 the solid material will be simultaneously further regenerated and cooled to about 900° F. It will be apparent that since the solid material is cooled only between the ranges of 1000° F. and 900° F. in stage 39 and between the ranges of 1100° F. and 900° F. in stage 41, that the cooling load in stage 41 is substantially greater than that in stage 39, hence two rows instead of one row of hairpin heat transfer coils are provided. The solid material will then pass through the remaining stages of the vessel in a similar manner being subjected to alternate regeneration with cooling and regeneration without cooling. The temperature of the solid material leaving the lowermost regeneration stage 45 may be adjusted to the desired regenerator outlet temperature by the heat transfer below the lowermost regeneration stage, and the solid material may then be withdrawn from the vessel through conduit 14. The rate of solid material withdrawal may be controlled by means of valve 15 so as to maintain a substantially compact column of said solid material within the vessel and so as to properly control the rate of solid material flow therethrough, thereby insuring its proper regeneration. Air either preheated or at atmospheric temperature is introduced through inlet conduit 23 and riser manifold 22 into pipes 21 to the inlet manifolds 20 for each level of inlet distributors. The rate of air introduction to any row of distributors may be controlled by valves 19 on inlet pipes 18. From each horizontal row of distributors the air flow divides, part passing upwardly and part downwardly through the solid material to the collector members 17 spaced vertically thereabove and therebelow. The spent regeneration gases, substantially disengaged from the solid material pass from under collector members 17 through pipes 24, manifolds 25, and pipes 26, respectively, into the gas outlet riser conduit 27. Heat exchange fluid which may be a suitable gas or liquid medium, or a liquid medium subject to vaporization in the heat transfer coils, is passed from an external temperature adjusting system through conduit 36 into the riser manifold 34 from which it passes through pipes 33 and manifolds 32, respectively, into the individual heat transfer coils 28. The heat exchange fluid passes from the opposite ends of said coils through manifolds 29 and pipes 30 into outlet riser conduits 31 from which it is conducted through conduit 35 back to the temperature conditioning system. The rate of heat exchange medium flow through the individual heat transfer coils in each stage provided with such coils may be controlled by valves 47 on the outlet ends of said coils. The temperature of the inlet heat exchange medium may range from atmospheric to temperatures only slightly below that of the solid material, and is preferably controlled at a temperature substantially below that of the solid material so as to provide a high temperature differential for heat transfer.

The number of rows of heat transfer tubes provided in any given stage depends to a great extent on the location of that stage. The reason for this is that due to the change in the chemical composition of the contaminant deposit at various stages of the regeneration and due to the increasing difficulty of removing the last fraction of the contaminant deposit, the rate of combustion and heat release may vary from stage to stage and generally decreases in the later portion of the regeneration. In order to counteract this tendency for reduced burning rates during the later stages of the regeneration, it has been found desirable to maintain the solid material to as high an average temperature as possible during its passage through the latter burning stages. Thus the solid material may be alternately cooled from 1100° F. to 1000° F. and heated from 1000° F. to 1100° F. during its passage through the later regeneration stages. It will now be apparent that less heat transfer surface will be required in the later or lowermost stages of the regenerator than in the intermediate stages in such an operation as above described.

In the apparatus described hereinabove, the cooling coils are positioned in those alternate stages wherein the direction of gas flow is downward. If desired, however, the cooling coils may be positioned in those alternate stages wherein the direction of gas flow is upward. Moreover, in some modifications the cooling coils may be positioned in alternate stages only within the intermediate section of the vessel, or for some operations the cooling coils may be positioned only in those stages wherein their presence is required to permit proper control of solid material temperature range in the general manner described hereinabove in connection with the regenerator operation. In the latter arrangement, although the coils may not be arranged in alternate stages with regard to the gas inlet and outlet members, yet they should be so arranged as to provide alternate sections in the vessel between the levels of the coil positions, wherein the solid material may be subjected to the thermochemical gaseous reaction in the absence of heat transfer tubes or coils.

In many gas-solid contact operations a substantial increase in gas volume occurs during the contacting. This often gives rise to added difficulty in withdrawing the gas from the contacting vessel without considerable entrainment of the solid material. For such operations and often for operations not involving an increase in gas volume, it is preferable to provide an apparatus such as is shown in Figure 2. In Figure 2 is shown an upper portion of a reaction vessel similar in many respects to that in Figure 1 and like elements carry like numerals. In this reaction vessel 10 the inlet gas distributors 65 and 66 are arranged similarly to those in the apparatus of Figure 1, adjacent stages sharing common inlet distributors or channels. More outlet collector channels are provided, however, so that each stage has a separate row of collector channels. Thus for stages 88, 89, 90, 91 and 92, the collectors 60, 61, 62, 63, and 64 respectively are provided. Gas may be withdrawn from these collectors through pipes 68, manifolds 73 and pipes 80 which connect them into outlet riser duct 27. With this collector arrangement alternate stages of upward and downward gas flow are still provided, but the amount of reaction gas withdrawn from any collector is only about half of that admitted to any distributor. It will be obvious that the rate of gas flow at the location of gas-solid disengagement in this type apparatus will be only half the rate in the apparatus of Figure 1, so that the tendency to entrain solid material is greatly reduced. Valves 95 may be provided in the outlet pipes 68 to permit independent control of the rate of gas flow in each stage even though such stages have common gas inlets. Heat exchange tubes 87 are provided in certain of the stages. These tubes are shown extending across the vessel in a horizontal direction perpendicular to the plane of the drawing and at right angles to the collector and distributor channels. The inlet and outlet manifolds to these heat transfer tubes are not shown in order to prevent complicating the drawing. The operation of the apparatus of Figure 2, except for obvious modifications is similar to that described hereinabove for Figure 1.

The proper dimensions and the conditions for the apparatus and method of this invention are largely dependent upon the particular process to which it is applied. In general, the volume of the alternate stages or group of stages wherein thermochemical reaction is conducted in the absence of heat transfer tubes should be at least sufficient to permit an amount of reaction therein sufficient to change the temperature of the solid material between predetermined inlet and outlet levels. Obviously the predetermined temperature levels depend upon the type of solid material and the type of reaction involved; and the allowable spread between such inlet and outlet temperature levels will be an important factor deciding the stage volume. The other important factor deciding the required volume of said stage or group of stages is the rate of the reaction involved and the amount of heat liberated or absorbed thereby. Generally the required stage volume increases with increase in allowable spread between the solid material inlet and outlet temperatures and with decrease in rate of reaction. As regards these alternate stages or group of stages wherein heat transfer tubes are provided, broadly the total volume of each such alternate stage or alternate group of stages should be sufficient to permit installation of the amount of heat transfer surface required for changing the solid material temperature between the predetermined set levels hereinabove mentioned. Generally, where heat transfer tubes are provided in alternate stages, it has been found preferable that the length and volume of adjacent stages, one being provided with heat transfer tubes and one being without such tubes, be approximately the same. This does not preclude, however, an arrangement wherein the stages in the uppermost half of the stage series are all of one equal length and those of the lowermost half of the stage series are all of a different equal length.

Generally the ratio of stage length to cross-section is regulated by the gas throughput requirements of the particular operation involved. The stage cross-section should be sufficiently great to permit the gas throughput required to support the desired amount of reaction therein, as determined by the amount of heat liberation and absorption thereby, without permitting a linear rate of gas flow through the column of solid material within the stage which would substantially disrupt said column or interfere with the downward flow of the solid material. The number of stages used is dependent in the case of regenerators upon the total amount of contaminant deposit to be removed from the solid material and upon the desired linear rate of flow of the solid material through the regenerator stages.

When the invention is applied to a process such as the regeneration of clay-type catalysts bearing carbonaceous contaminants deposited in a prior catalytic hydrocarbon conversion step, it has been found that the preferable range of catalyst flow through the regenerator should be between about 0.5 to 6 linear feet per minute and that the contaminant deposit may vary between 0.5 to 10% by weight of the catalyst, and that the required number of stages may vary from 2 to 80. The preferred stage length or vertical distance between gas distributing and collector members may range from 0.5 to 10.0 feet. When a catalyst of about 40 pounds per cubic foot density is used, air rates should be controlled so that the maximum pressure gradient due to upward gas flow is less than 7.5 inches of water per foot at any location in the kiln. The maximum permissible air rates will vary depending on the design of the gas distribution and collection systems, the temperature and pressure of the flowing gas and the size and density of the catalyst. Generally the preferred spread between the temperature of solid material entering and the solid material leaving a given stage may be of the order of 20° F. to 300° F. and the amount of heat transfer surface provided in alternate stages is adjusted accordingly.

It will be seen that the method and apparatus of this invention, by the provision of heat transfer tubes in only part rather than in all the reaction zones, overcomes the hereinbefore mentioned disadvantages of long single stage reaction vessels having heat transfer tubes throughout the reaction zone therein. Thus when the method and apparatus of this invention is applied to the process for regenerating contaminant bearing solid contact mass materials the catalyst may be safely maintained at higher burning temperatures during the latter stages of the regeneration thereby permitting a more rapid and thorough regeneration than possible in the former type regenerators. Moreover by the provision for multi-stage gas flow with adjacent stages sharing common gas inlet, high gas throughput capacity is provided such as is characteristic of multi-stage regenerators having separate heat exchange sections between stages. By incorporation of the heat transfer tubes in alternate reaction stages, the necessity for separate cooling stages between each reaction stage is eliminated, thereby substantially simplifying the apparatus, increasing its reaction capacity per volume of vessel, and reducing the overall equipment cost. Further simplification and reduction in apparatus cost is provided by the "split gas flow" type of operation which may reduce by half the number of gas distribution and collector members and the number of gas inlet and outlet piping arrangements required for a given installation.

It should be understood that the attached drawing and the description of the apparatus of this invention and of the method of operation and application of this invention are merely exemplary in character and are in no way intended to limit the scope thereof except as it is limited in the attached claims.

I claim:

1. In an apparatus of the type described, a substantially vertical vessel closed on either end, means to continuously introduce particle form solid contact mass material into the upper end of said vessel, means to continuously withdraw said solid material from the lower end thereof, a plurality of vertically spaced apart sets of gas inlets to said vessel and gas outlets from said vessel, each set comprising two vertically spaced apart gas outlets and a gas inlet positioned vertically between said two gas outlets, the gas outlets in adjacent sets being spaced vertically apart along said vessel, groups of heat transfer tubes positioned within said vessel at only some of the levels between said gas inlets and outlets so as to provide alternating vertical sections along said vessel wherein heat transfer tubes are provided between adjacent gas inlets and outlets and wherein no heat transfer tubes are provided between adjacent gas inlets and outlets, and means to pass a heat exchange fluid through said heat transfer tubes.

2. An apparatus for conducting thermochemical gaseous reactions comprising: an elongated substantially vertical vessel suitable for confining a substantially compact column of downwardly flowing particle form solid adsorbent material, means to continuously admit said solid material to the upper end thereof, means to continuously withdraw said solid material from the lower end thereof, a plurality of superposed groups of gas handling members, each group comprising two vertically spaced separate rows of horizontally spaced inverted gas collecting troughs and substantially midway vertically between said rows of gas collecting troughs, a row of inverted gas distributing troughs, each trough extending lengthwise horizontally across said vessel, and the collecting troughs in adjacent groups being spaced vertically apart along said vessel, inlet manifolding communicating with the rows of gas distributing troughs in each group and flow throttling means on said inlet manifolding to permit independent control of the rate of gas supply to each row of distributing troughs, outlet manifolding communicating with said rows of collecting troughs, heat transfer tubes positioned within said vessel at only some of the levels between said rows of distributing and collecting troughs so as to provide alternating vertical sections along said vessel wherein heat transfer tubes are provided between adjacent gas distributing and collecting troughs, and means to pass a heat exchange fluid through the heat transfer tubes at each level at independently controlled rates.

3. The method for regenerating a particle form contact material bearing a carbonaceous contaminant deposit which comprises: passing said contaminant bearing particle form contact material as a substantially compact column downwardly through a vertical series of alternating combustion zones wherein the contaminant is burned in the substantial absence of cooling and combination combustion and cooling zones wherein the contaminant is burned in the presence of cooling by indirect heat transfer with a cooling fluid, introducing streams of combustion supporting gas into said column at alternate common levels between adjacent combustion and combination combustion and cooling zones, splitting said streams to cause a portion of each stream to flow upwardly through one of said zones from its level of introduction and the remaining portion to flow downwardly through the adjacent zone from the same level of introduction, withdrawing the gaseous regeneration products from said column as a plurality of streams from the remaining alternate common levels between adjacent combustion and combination combustion and cooling zones, passing a suitable cooling fluid in indirect heat transfer relationship with said column in each of said combination combustion and cooling zones to effect a substantial descrease in the contact material temperature in said combination combustion and cooling zones while excluding cooling by indirect heat transfer in said combustion zones so as to permit a substantial rise in the contact material temperature in said combustion zones.

4. A method of regenerating a particle form contact material bearing a carbonaceous contaminant by burning with an oxygen containing gas which comprises: passing a particle form contact material bearing a carbonaceous contaminant deposit as a substantially compact column through a series of superimposed zones wherein it is contacted with streams of oxygen containing gas passing therethrough alternately upwardly and downwardly in successive zones to effect burning of said contaminant, and passing a cooling fluid in indirect heat transfer relationship with said contact material in only some of said zones at a plurality of levels along said column so as to control the temperature range of said contact material flowing through said series of zones while effecting contact between said contact material and said oxygen containing gas in the remaining zones spaced along the length of said column in the absence of indirect heat transfer with said cooling fluid, and adjusting the amount of cooling by said cooling fluid in the zones of indirect heat transfer to effect cooling of the contact material to substantially lower burning temperatures in those of said zones lying in the intermediate portion of the zone series than in those lying in the later portion of the zone series.

5. A method for removal of contaminant deposits from a particle form solid contact material by burning with a combustion supporting gas at controlled elevated temperatures comprising: maintaining a substantially compact column of downwardly flowing particle form solid contact material; replenishing said column at its upper end with said contaminant bearing contact material; withdrawing regenerated contact material from the lower end of said column at a controlled rate; introducing streams of combustion supporting gas into said column at a plurality of levels vertically spaced along the column length, splitting each of said streams into two secondary streams one of which flows upwardly through a section of said column length and the other of which flows downwardly through another section of the column length, withdrawing said secondary streams from said column separately of each other before any secondary stream flowing from one introduction level along said column merges with any secondary stream flowing from any other level along said column; passing a suitable cooling fluid in indirect heat transfer relationship with said column at spaced apart intervals along its length within only some of said sections for gas flow to effect control of said contact material flowing in said column below a heat damaging temperature and excluding said cooling fluid from the remaining sections for gas flow along said column, whereby said contact material in said column flows downwardly through alternating zones of contaminant burning in the absence of cooling by indirect heat transfer and zones of contaminant burning in the presence of cooling by indirect heat transfer.

6. A method for regeneration of particle form solid absorbents bearing carbonaceous contaminant deposits which comprises, passing said adsorbent as a substantially compact column downwardly through a series of zones wherein it is contacted with streams of oxygen containing gas flowing alternately upwardly and downwardly in successive zones to effect burning of said contaminant deposit, passing a suitable cooling fluid in indirect heat transfer relationship with the adsorbent in vertically spaced apart sections along said column, which sections correspond to some of said zones of oxygen containing gas flow and excluding said cooling fluid from the zones of oxygen containing gas flow lying between said spaced apart sections, whereby the adsorbent in said column is subjected alternately to contaminant burning in the absence of indirect heat transfer with a resultant rise in temperature and to contaminant burning in the presence of indirect heat transfer with a resultant fall in temperature.

THOMAS P. SIMPSON.

REFERENCES CITED

The following references are of record in the file of this patent:

UNITED STATES PATENTS

| Number | Name | Date |
|---|---|---|
| 405,214 | Hill | June 11, 1889 |
| 558,508 | Metcalf | Apr. 21, 1896 |
| 1,709,351 | Jones | Apr. 16, 1929 |
| 1,784,536 | Pantenburg | Dec. 9, 1930 |
| 1,892,319 | Roth | Dec. 27, 1932 |
| 1,905,883 | Barstow et al. | Apr. 25, 1933 |
| 2,159,140 | Eckell et al. | May 23, 1939 |
| 2,303,717 | Arveson | Dec. 1, 1942 |
| 2,311,984 | Guild | Feb. 23, 1943 |
| 2,317,379 | Hemminger | Apr. 27, 1943 |
| 2,320,318 | Simpson et al. | Apr. 25, 1943 |
| 2,320,562 | Bransky | June 1, 1943 |
| 2,356,611 | Peters | Aug. 22, 1944 |
| 2,362,621 | Fahnestock | Nov. 14, 1944 |
| 2,364,453 | Layng et al. | Dec. 5, 1944 |
| 2,387,936 | Nicholls et al. | Dec. 30, 1945 |
| 2,409,596 | Simpson et al. | Oct. 15, 1946 |
| 2,419,245 | Arveson | Apr. 22, 1947 |